US011795938B2

(12) United States Patent
Gustafsson

(10) Patent No.: US 11,795,938 B2
(45) Date of Patent: Oct. 24, 2023

(54) IVORY SYSTEM FOR VAPOUR RECOVERY

(71) Applicant: Dover Fueling Solutions UK Limited, Edinburgh (GB)

(72) Inventor: Gustaf Gustafsson, Glemmingebro (SE)

(73) Assignee: Dover Fueling Solutions UK Limited, Edinburgh (GB)

( * ) Notice: Subject to any disclaimer, the term of this patent is extended or adjusted under 35 U.S.C. 154(b) by 0 days.

(21) Appl. No.: 17/975,502

(22) Filed: Oct. 27, 2022

(65) Prior Publication Data

US 2023/0045863 A1 Feb. 16, 2023

Related U.S. Application Data

(62) Division of application No. 16/769,117, filed as application No. PCT/EP2018/084382 on Dec. 11, 2018.

(30) Foreign Application Priority Data

Dec. 15, 2017 (EP) ..................................... 17207782

(51) Int. Cl.
*F04B 49/06* (2006.01)
*B67D 7/04* (2010.01)
(Continued)

(52) U.S. Cl.
CPC ............ *F04B 49/06* (2013.01); *B67D 7/0476* (2013.01); *B67D 7/0486* (2013.01); *F04B 17/04* (2013.01);
(Continued)

(58) Field of Classification Search
CPC ............ F04B 35/045; F04B 2203/0401; F04B 2203/0402; F04B 49/065; F04B 49/06;
(Continued)

(56) References Cited

U.S. PATENT DOCUMENTS 4,080,552 A * 3/1978 Brown .................. F04B 17/046
318/128
6,681,583 B2 * 1/2004 Taguchi ................ F04B 49/065
62/133

(Continued)

FOREIGN PATENT DOCUMENTS

EP 3498660 A1 6/2019
GB 2352437 A 1/2001
(Continued)

OTHER PUBLICATIONS

European Search Report issued in European Application No. 17207782.8, dated Jun. 8, 2018, 10 pages.
(Continued)

*Primary Examiner* — Peter J Bertheaud
(74) *Attorney, Agent, or Firm* — MINTZ LEVIN COHN FERRIS GLOVSKY AND POPEO, PC

(57) ABSTRACT

The invention relates to a method for controlling a linear pump of a vapour recovery system in a fuel dispensing unit. The linear pump is flow controlled by a signal. The method comprises applying a known voltage to a solenoid coil of the linear pump for a predetermined time period, measuring a current consumption of the solenoid coil during the predetermined time period, and adjusting the signal based on the measured current consumption. The invention also relates to a vapour recovery system for recovering vapour from a motor vehicle tank via a fuel dispensing nozzle to a vapour tank.

19 Claims, 3 Drawing Sheets

(51) Int. Cl.
 *F04B 17/04* (2006.01)
 *F04B 35/04* (2006.01)
 *H02P 25/032* (2016.01)
 *F02D 41/20* (2006.01)

(52) U.S. Cl.
 CPC .......... *F04B 17/044* (2013.01); *F04B 35/045* (2013.01); *F04B 49/065* (2013.01); *H02P 25/032* (2016.02); *F02D 2041/2058* (2013.01); *F04B 2203/0401* (2013.01); *F04B 2203/0402* (2013.01)

(58) Field of Classification Search
 CPC .......... F04B 17/04; F04B 17/044; B67D 7/54; B67D 7/0486; B67D 7/0476; F02D 2041/2058; H02P 25/032
 See application file for complete search history.

(56) References Cited

U.S. PATENT DOCUMENTS

| | | | | |
|---|---|---|---|---|
| 6,899,149 | B1* | 5/2005 | Hartsell, Jr. | B67D 7/0486 141/192 |
| 7,408,310 | B2* | 8/2008 | Hong | F04B 35/045 417/44.1 |
| 8,057,190 | B2 | 11/2011 | Reinschke | |
| 2005/0141998 | A1 | 6/2005 | Yoo et al. | |
| 2021/0221670 | A1 | 7/2021 | Gustafsson | |

FOREIGN PATENT DOCUMENTS

| | | |
|---|---|---|
| WO | 2012089246 A1 | 7/2012 |
| WO | 2019115538 A1 | 6/2019 |

OTHER PUBLICATIONS

International Preliminary Report on Patentability received for PCT International Application No. PCT/EP18/84382, dated Jun. 25, 2020, 9 pages.

International Search Report and Written Opinion of International Application No. PCT/EP2018/084382 dated Feb. 22, 2019, 11 pages.

* cited by examiner

IVORY SYSTEM FOR VAPOUR RECOVERY

CROSS-REFERENCE TO RELATED APPLICATIONS

The present application is a divisional of U.S. application Ser. No. 16/769,117 filed on Jun. 2, 2020, which is a national stage application of PCT/EP18/84382, filed on Dec. 11, 2018, which claims priority to European Application 17207782.8 filed on Dec. 15, 2017. The entire contents of each of these applications are incorporated herein by reference in their entireties.

FIELD

The invention relates to a method for controlling a linear pump of a vapour recovery system in a fuel dispensing unit. The invention also relates to a vapour recovery system for recovering vapour from a motor vehicle tank via a fuel dispensing nozzle to a vapour tank.

BACKGROUND

When filling the tank of a motor vehicle, it is a common measure to recover the vapour escaping the tank when filling it with liquid fuel from a fuel pump unit. The vapour recovery is performed by a system which is incorporated in the fuel pump unit, such that vapour of hydrocarbons are prevented from escaping to the environment outside the tank of the motor vehicle. Such vapour recovery system typically consists of a vapour inlet arranged in a fuel dispensing nozzle, a vapour pump and a flow meter. The recovered vapour is accumulated in a vapour tank.

The vapour pump draws fuel vapour from the tank of the motor vehicle, through the flow meter and to the vapour tank. The flow meter measures the vapour flow and compares the measured value with the flow of dispensed fuel. Adjusting means are connected to the flow meter and to the vapour pump so that the vapour flow matches the flow of the dispensed fuel Since a vapour recovery system consists of several components, there are several possible causes for such vapour recovery system to malfunction. If the value measured by the flow meter drops, this might be due to e.g. pump failure, flow meter failure, or dust, particles or other obstruction in the vapour line. Thus, there is a need for checking the correct operation of a vapour recovery system.

GB 2352437 discloses a method for control of a vapour recovery system. The vapour delivery rate is constantly detected. The value of the vapour delivery rate thus detected is transmitted to comparison means which compare it with a value of the liquid delivery rate and if the result of this comparison is outside a predetermined range, which may or may not be adjustable, an alarm is triggered in order to indicate a malfunction.

A problem associated with the existing prior art is that the vapour recovery systems are sensitive in terms of controlling the flow rate, e.g. due to temperature changes, clogging of nozzles and liquid flushes that temporarily impact the capacity of system.

SUMMARY

It is an objective of the present invention to provide an improvement of the above technique and prior art. More particularly, it is an objective of this invention to provide an improved method for controlling a linear pump of a vapour recovery system in a fuel dispensing unit.

According to a first aspect, these and other objects, and/or advantages that will be apparent from the following description of embodiments, are achieved, in full or at least in part, by a method for controlling a linear pump of a vapour recovery system in a fuel dispensing unit. The linear pump is flow controlled by a signal. The method comprises applying a known voltage to a solenoid coil of the linear pump for a predetermined time period, measuring a current consumption of the solenoid coil during the predetermined time period, and adjusting the signal based on the measured current consumption.

In other words, during nozzle lift or even during the operation of the fuel dispensing unit, a known voltage, switched or fixed, is applied over the coil to measure the current consumption and adjust the signal based on the same.

This is especially advantageous in that a much more exact control of the vapour recovery system can be established. In turn, this will reduce risk of shutting down systems because of temperature inconstancy. Furthermore, it is also possible to measure during one sinus wave at the start of the operation of the fuel dispensing unit and then measure again later during the operation of the fuel dispensing unit to determine if the system is affected during the refueling itself. This could be done by measuring the current but the form of the sinus wave is also affected.

The method may further comprise calculating a resistance of the solenoid coil based on the current consumption, and converting the calculated resistance into a temperature based on which the signal is adjusted.

As the resistance is dependent on heat build-up, ambient and pumped media temperature, the value can then be converted to a temperature.

The calibrated power width modulation curve may thereafter be offset depending on the measured temperature. Each pump has a known resistance at 20° which is labelled on the pump that can be used in order to handle variations on different coils.

The signal may be adjusted per an algorithm in a control unit based on the measured current consumption or the calculated resistance or temperature.

The predetermined time period may be based on a duration of at least one cycle of a current consumption curve obtained from the signal.

The steps of the method are conducted before a refueling may be started in the fuel dispensing unit.

The steps of the method may be conducted during operation of the fuel dispensing unit. This way, it will be possible to also compensate for the self-heating of the fuel dispensing unit during operation. Preferably, the current consumption of the solenoid coil is at first measured when the fuel dispensing unit is in an idle state and thereafter during operation. By comparing the calculated resistance based on the current consumption from these measurements the temperature due to self-heating of the fuel dispensing unit during operation may be determined and considered when adjusting the signal. Naturally, several measurements may be conducted during the operation of the fuel dispensing unit such that the signal can be continuously adjusted.

The step of adjusting the signal may be further based on a pressure drop due to the operation of the fuel dispensing unit. The pressure drop may be measured in real time and or be continuously monitored by the control unit. Another alternative is to monitor which nozzle is presently being used for the refueling operation(s) and thereafter read off a pressure drop value from a table based on the model of the fuel dispensing unit.

The method may further comprise continuously monitoring the geometry of a current consumption curve obtained from the signal during operation of the fuel dispensing unit, and comparing the geometry of the obtained current consumption curve with the geometry of a current consumption curve obtained from the signal during calibration of the fuel dispensing unit.

By learning the geometry of the current consumption curve when the fuel dispensing unit functions in a satisfactory manner it is possible to discover any type of failure in the fuel dispensing unit during operation by monitoring the geometry of the current consumption curve over time.

The signal may be a power width modulation signal.

According to a second aspect, these and other objects are achieved, in full or at least in part, by a vapour recovery system for recovering vapour from a motor vehicle tank via a fuel dispensing nozzle to a vapour tank. The vapour recovery system comprises a linear pump configured to pump vapour from the motor vehicle tank to the vapour tank, the linear pump being flow controlled by a signal applied to a solenoid coil, and a control unit configured to adjust the signal based on a measured current consumption of the solenoid coil.

The control unit may further be configured to apply a known voltage to a solenoid coil of the linear pump for a predetermined time period, and measure the current consumption of the solenoid coil during the predetermined time period.

The control unit may further be configured to calculate a resistance of the solenoid coil based on the current consumption, and to convert the calculated resistance into a temperature based on which the signal is adjusted.

The signal may be a power width modulation signal.

Effects and features of the second and third aspect of the present invention are largely analogous to those described above in connection with the first aspect of the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION

Figure 1:
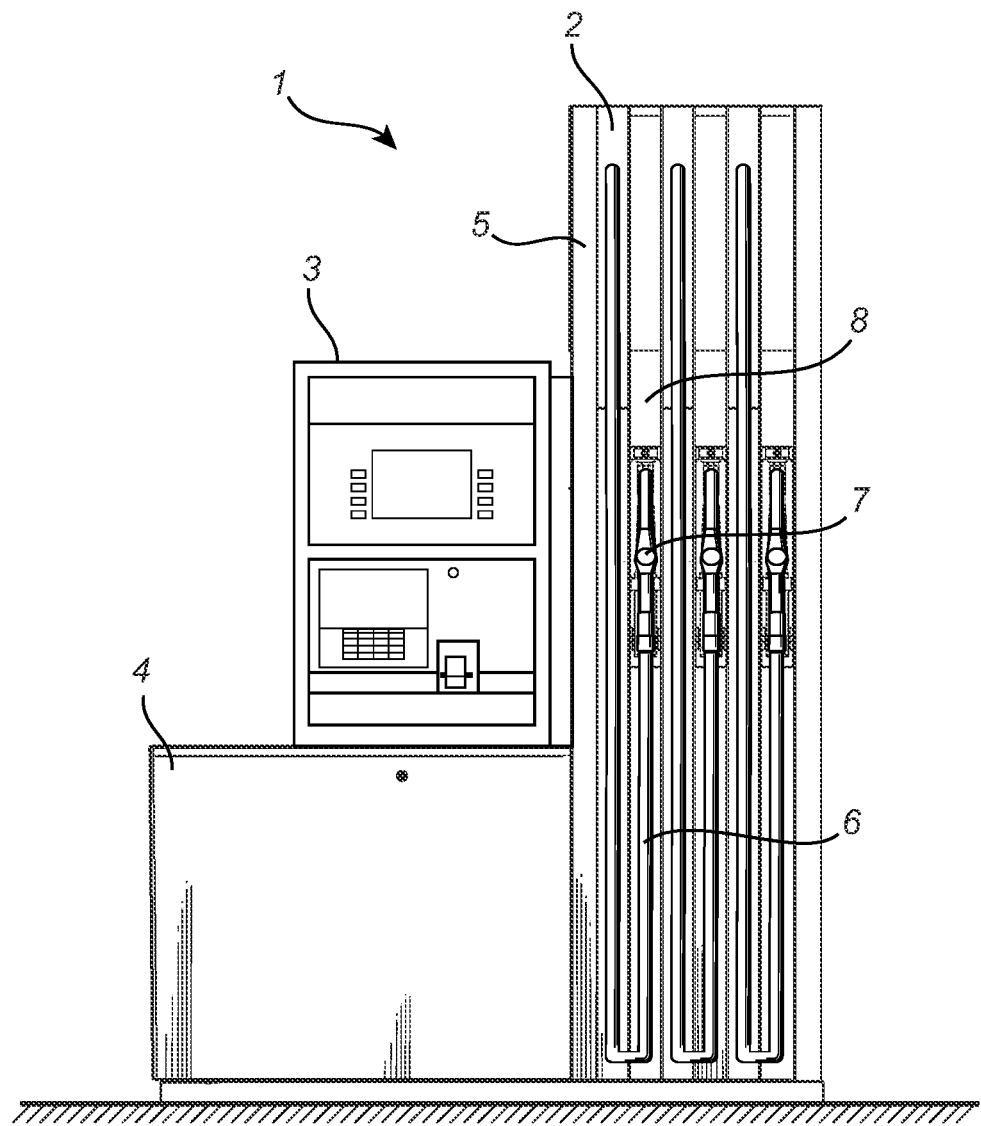
FIG. 1 is a schematic view of an exemplary embodiment of a fuel dispensing unit comprising a vapour recovery system according to a second aspect of the invention.

FIG. 1 illustrates a fuel dispensing unit 1 having hose storage spaces 2 on each opposing side, an electrical cabinet 3 containing all the electronics for the fuel dispensing unit 1, a hydraulic cabinet 4 containing fuel dispensing means (not shown), e.g. fuel metering means, valves, vapour recovery system etc., and a column 5 extending vertically between and separating the electrical cabinet 3 and the hydraulic cabinet 4 from the hose storage spaces.

The fuel dispensing unit 1 is connected to an underground reservoir (not shown) containing fuel. When filling up the tank of a motor vehicle, the fuel is pumped from the underground reservoir by means of a pump which is located in the hydraulic cabinet 4, and from there to the column 5 and out to a nozzle 7 via a hose 6.

The fuel dispensing unit 1 has a nozzle boot 8 for each nozzle 7, which nozzle boot 8 preferably comprises a sensor (not shown) for detecting if the nozzle 7 is present in the nozzle boot 8. Further, the nozzle 7 is equipped with a flow meter (not shown) for detecting the fuel flow rate from the nozzle 7 upon refuelling.

Figure 2:
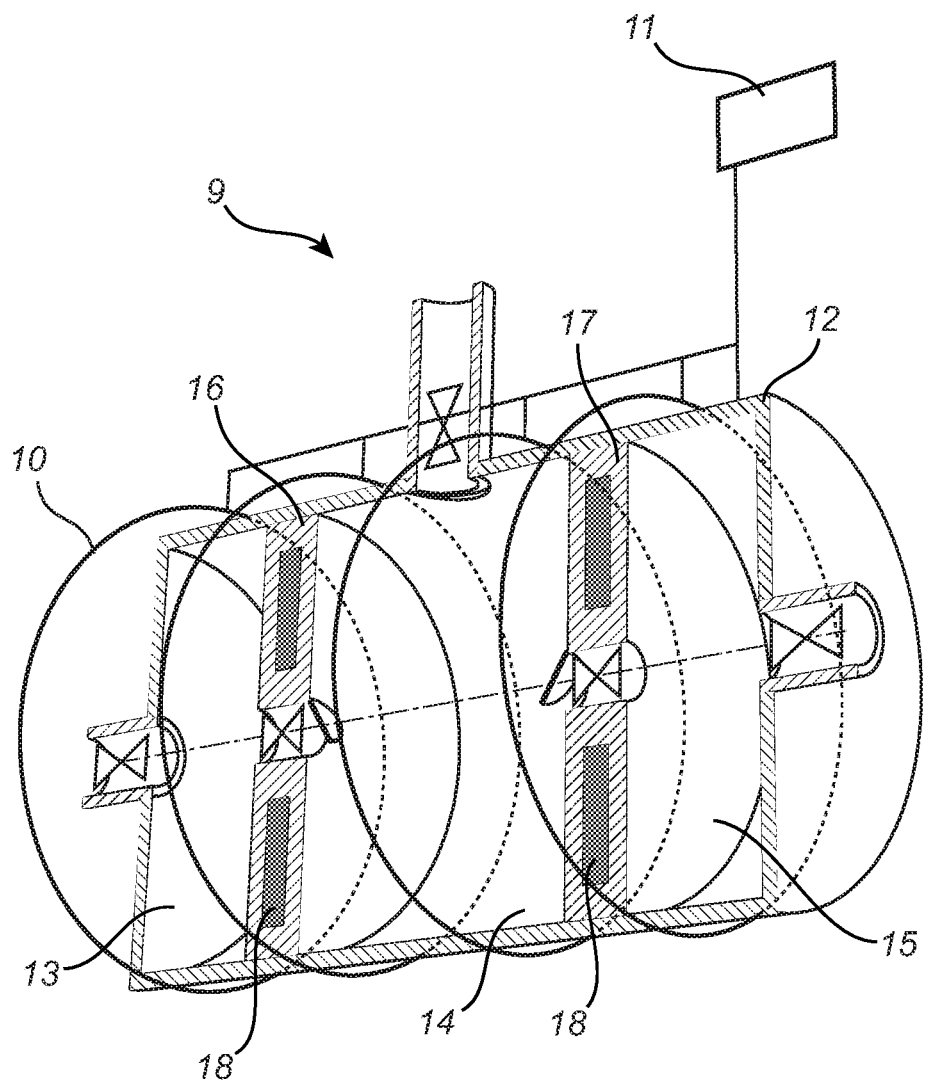
FIG. 2 is a perspective view of the vapour recovery system according to the second aspect of the invention.

In FIG. 2, an exemplary embodiment of the vapour recovery system is illustrated. The vapour recovery system is used to recover vapour from the motor vehicle tank via the nozzle 7 to a vapour tank (not shown). The vapour recovery system comprises a linear pump 9 which is flow controlled by a signal applied to a solenoid coil 10 and which is configured to pump vapour from the motor vehicle tank to the vapour tank. In this specific embodiment, the signal is a power width modulation signal.

The vapour recovery system further comprises a control unit 11 which is configured to adjust the signal based on a measured current consumption of the solenoid coil 10. More specifically, in this exemplary embodiment, the control unit 11 is configured to adjust the power width modulation signal based on a resistance of the solenoid coil 10. The resistance of the solenoid coil 10 is calculated by applying a known voltage to the solenoid coil 10 for a predetermined time period, measuring a current consumption of the solenoid coil 10 during the predetermined time period, and calculating a resistance of the solenoid coil 10 based on the current consumption.

The linear pump 9 has a pump housing 12 comprising a first chamber 13, a second chamber 14 and a third chamber 15. The first and second chambers 13, 14 are separated by a first piston 16 and the second and third chambers 14, 15 are separated by a second piston 17. The first and second pistons 16, 17 are movable in a horizontal direction of the pump housing 12 in order to repeatedly decrease and increase the volumes of the chambers 13, 14, 15 during use of the vapour recovery pump 9. The first and second pistons 16, 17 move reciprocally and substantially out of phase in relation to each other within the pump housing 12. The volume of each chamber 13, 14, 15 depends on the location of the pistons 16, 17, but the total volume of the chambers 13, 14, 15 is constant. The volumes of the first and third chambers 13, 15 are, however, always substantially equal in relation to each other. In this embodiment, each one of the first and second pistons 16, 17 comprises a magnetic device 18. The control unit 11 includes electromagnetic control means which is provided to move the pistons 16, 17 by altering a magnetic field.

Figure 3:
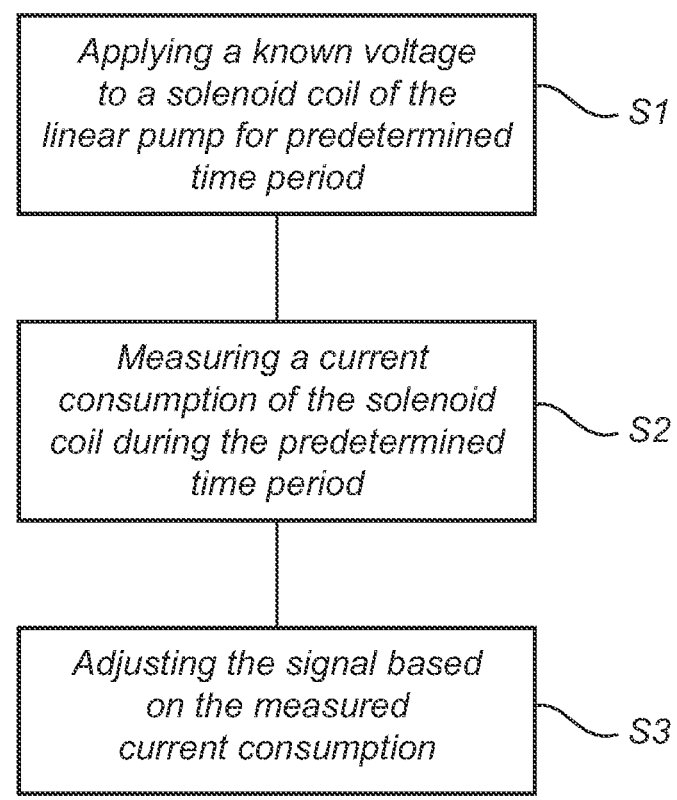
FIG. 3 is a flow chart of a method for controlling a linear pump of a vapour recovery system according to a first aspect of the invention.

FIG. 3 illustrates an exemplary embodiment of a method for controlling the linear pump 9 of the vapour recovery system. The method comprises applying S1 a known voltage to the solenoid coil 10 of the linear pump 9 for a predetermined time period, measuring S2 a current consumption of the solenoid coil during the predetermined time period, and adjusting S3 the signal based on the measured current consumption.

The skilled person realizes that a number of modifications of the embodiments described herein are possible without departing from the scope of the invention, which is defined in the appended claims.

What is claimed is:

1. A vapour recovery system for recovering vapour from a motor vehicle tank via a fuel dispensing nozzle to a vapour tank, comprising:
    a linear pump configured to pump vapour from the motor vehicle tank to the vapour tank, the linear pump being flow controlled by a signal applied to a solenoid coil; and
    a control unit configured to adjust the signal based on a measured current consumption of the solenoid coil.

2. The vapour recovery system according to claim 1, wherein the control unit is further configured to apply a known voltage to the solenoid coil of the linear pump for a predetermined time period, and measure the current consumption of the solenoid coil during the predetermined time period.

3. The vapour recovery system according to claim 1, wherein the control unit is further configured to calculate a resistance of the solenoid coil based on the current consumption, and to convert the calculated resistance into a temperature based on which the signal is adjusted.

4. The vapour recovery system according to claim 1, wherein the signal is a power width modulation signal.

5. The vapour recovery system according to claim 1, wherein the solenoid coil is a component of the linear pump.

6. The vapour recovery system according to claim 5, wherein the linear pump includes a pump housing, the pump housing including a first chamber having a first volume and a second chamber having a second volume, wherein the linear pump includes a first piston, and wherein the first chamber and the second chamber are separated by the first piston.

7. The vapour recovery system according to claim 6, wherein the pump housing includes a third chamber having a third volume, wherein the linear pump includes a second piston, and wherein the second chamber and the third chamber are separated by the second piston.

8. The vapour recovery system according to claim 7, wherein each of the first piston and the second piston are movable such that at least one of the first volume, the second volume and the third volume varies with movement of at least one of the first piston and the second piston.

9. The vapour recovery system according to claim 8, wherein the first piston and the second piston are configured to move reciprocally and out of phase in relation to each other within the pump housing.

10. The vapour recovery system according to claim 1, wherein the control unit is configured to adjust the signal using an algorithm.

11. A vapour recovery system, comprising:
    a linear pump configured to pump vapour from a motor vehicle tank to a vapour tank, the linear pump including a solenoid coil, the linear pump housed within a fuel dispensing unit; and
    a control unit configured to monitor a signal that flow-controls the linear pump and that is applied to a solenoid coil, to obtain a current consumption curve based on the signal and during an operation of the fuel dispensing unit, to measure a consumption of current by the solenoid coil for a predetermined time period, the predetermined time period determined from the current consumption curve, and to adjust the signal applied to the solenoid coil based on the measured consumption of current.

12. The vapour recovery system according to claim 11, wherein the control unit is further configured to apply a known voltage to the solenoid coil of the linear pump for the predetermined time period.

13. The vapour recovery system according to claim 11, wherein the control unit is further configured to calculate a resistance of the solenoid coil based on the measured consumption of current, and to convert the calculated resistance into a temperature based on which the signal is adjusted.

14. The vapour recovery system according to claim 11, wherein the signal is a power width modulation signal.

15. The vapour recovery system according to claim 11, wherein the linear pump includes a pump housing, the pump housing including a first chamber having a first volume and a second chamber having a second volume, wherein the linear pump includes a first piston, and wherein the first chamber and the second chamber are separated by the first piston.

16. The vapour recovery system according to claim 15, wherein the pump housing includes a third chamber having a third volume, wherein the linear pump includes a second piston, and wherein the second chamber and the third chamber are separated by the second piston.

17. The vapour recovery system according to claim 16, wherein each of the first piston and the second piston are movable such that at least one of the first volume, the second volume and the third volume varies with movement of at least one of the first piston and the second piston.

18. The vapour recovery system according to claim 17, wherein the first piston and the second piston are configured to move reciprocally and out of phase in relation to each other within the pump housing.

19. The vapour recovery system according to claim 11, wherein the control unit is configured to adjust the signal using an algorithm.

* * * * *